INVENTOR.
Walter J. Smith
BY Donald A. McLaren
Attorneys

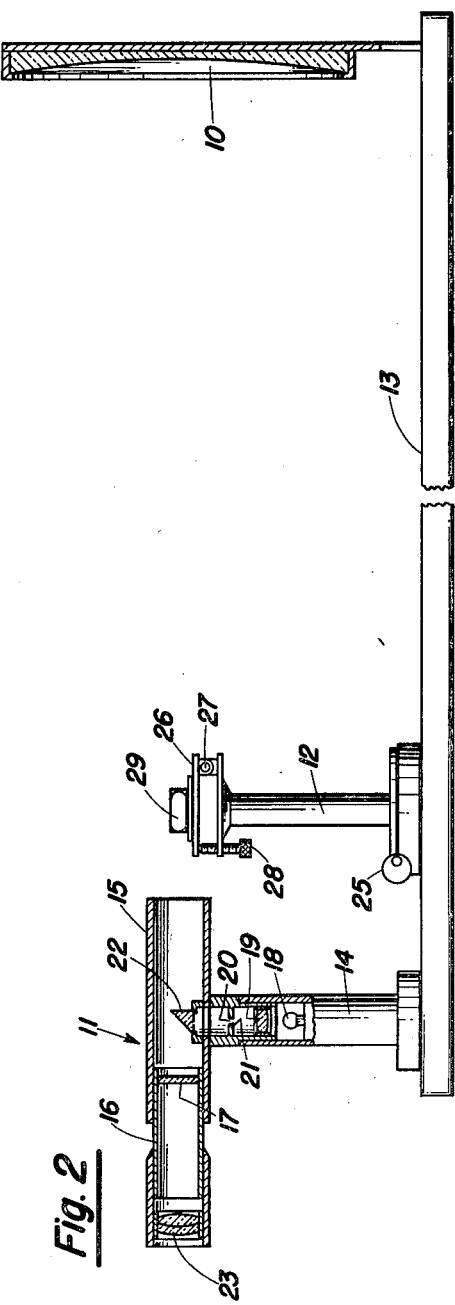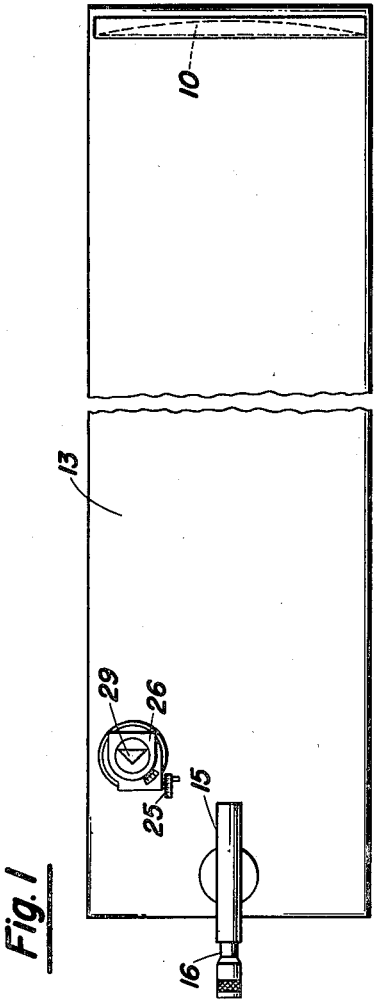

Patented July 20, 1954

2,684,011

UNITED STATES PATENT OFFICE 2,684,011

METHOD AND APPARATUS FOR MEASURING ANGLES BETWEEN REFLECTING SURFACES

Walter J. Smith, South San Francisco, and Donald A. McLaren, San Francisco, Calif.

Application May 8, 1951, Serial No. 225,255

5 Claims. (Cl. 88—14)

(Granted under Title 35, U. S. Code (1952), sec. 266)

This invention relates to a method and apparatus for testing the accuracy of and measuring the angle between two plane reflecting surfaces and more particularly to a method and apparatus using a parabolic mirror.

Prior art methods and apparatus used for accomplishing the purposes of this invention, especially for testing the accuracy of the angle between two prism faces, have usually employed systems including a collimating lens and a relatively large number of optical elements. An object of this invention is to use a system eliminating the need for a collimating lens and reducing to a minimum the number of optical elements so that the apparatus can be produced easily and inexpensively with relatively greater accuracy and a minimum of maintenance.

The apparatus comprises a point source of light located generally at the focus of a parabolic mirror, a support for maintaining within the field of view of the mirror a prism or the like to be tested so that light from the point source rendered parallel by the mirror is reflected back toward the mirror by the prism, and an eyepiece including a reticle located in the neighborhood of the focus of the mirror for observing images formed by the mirror. Reference is now made to the accompanying drawings wherein is shown a specific preferred embodiment of the apparatus of the invention useful in carrying out the method of the invention.

Fig. 1 is a plan view of a preferred embodiment of the invention,

Fig. 2 is an elevational view of the device of Fig. 1, and

Figure 3:
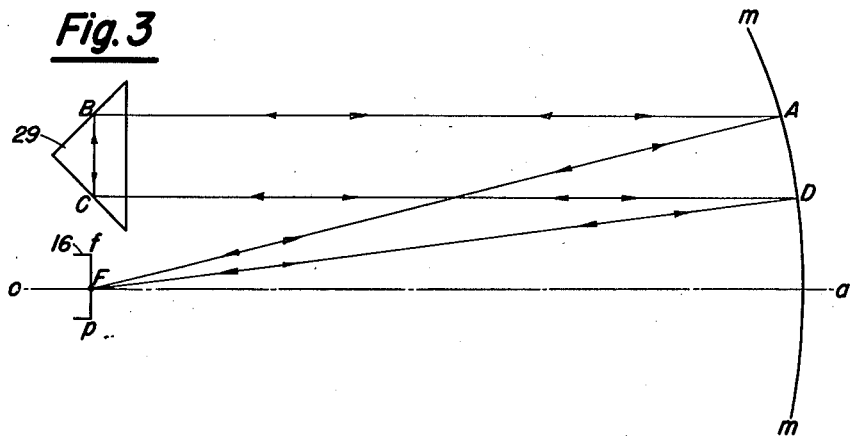
Figs. 3 through 5 are schematic illustrations of the invention.

The device shown in the drawings comprises a front-surfaced parabolic mirror 10, an illuminated ocular system 11 and a support 12 for prisms or the like all mounted conveniently for maintaining their relative positions on a base 13. The mirror 10 is mounted on a base to face the illuminated ocular system 11 and the support 12 is located so that a prism resting thereon is within the field of view of the mirror. The ocular system 11 comprises a cylindrical support 14 and a tube 15 fixed to the support 14 and carrying a sliding eyepiece 16 provided with a reticle 17. A substantially point source of light for the instrument is provided by a bulb 18 illuminating through a condensing lens 19, a pinhole 20 in a diaphragm 21. By virtue of the total reflection from a small prism 22 the point source appears to be located on the axis of the tube 15 at a point back of the hypotenuse surface of the prism 22 a distance equal to the distance from the pinhole 20 to the hypotenuse surface. The support 14 is so positioned relative to the mirror 10 that this virtual image of the point light source, which image constitutes the effective point source of light, is located substantially at the focus of the mirror 10 and so that the axis of the tube 15 is substantially coincident with the axis of the mirror 10.

The eyepiece 16 is arranged so that the reticle 17 is at the focus of the eyepiece lens 23 and the eyepiece can slide in the tube so that the reticle passes through a position coincident with the location of the virtual image of the point source which is also the focus of the mirror 10. That is, the eyepiece can be moved so that the reticle 17 moves into and out of the focal plane of the mirror. As indicated, the axis of the tube 15 ideally lies along the optical axis of the mirror 10 but as a practical matter the axis of the tube 15 need not be coincident with the mirror axis and neither need the effective light source be exactly at the focus of the mirror, although it should be in the focal plane. When the effective light source is not exactly at the focus of the mirror any images thereof reflected from the mirror are not so sharply defined.

The prism support 12 can conveniently be provided with a rotatable mount 25 having a vernier adjustment and scale. To carry a prism or the like the support 12 has a table 26 hinged at 27 and with a tilting screw 28. With the vernier 25 the support and the prism can be rotated in azimuth and its angle of rotation measured. With the tilting screw 28 the prism can be angularly adjusted in altitude.

The reticle 17 is preferably provided with graduated horizontal and vertical cross hairs that can be calibrated in a known manner to read directly the error in, for example, a 90° prism as shown at 29 on the prism support. The calibration is made with the use of a well known equation involving the refractive index of the prism glass, the separation of the images on the reticle, and the focal length of the mirror.

Figure 4:
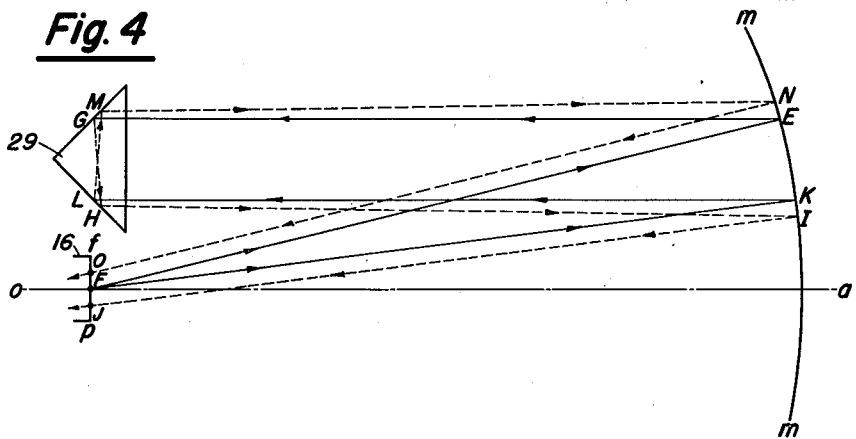
Figure 5:
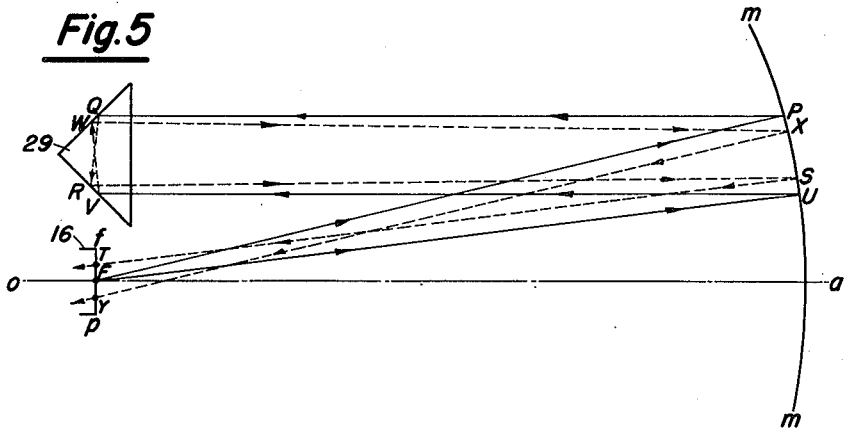

The principles of operation of the apparatus and the method of the invention will be apparent from Figs. 3, 4 and 5. In all the figures $mm$ represents the parabolic mirror 10 with its focus at F. The line $oa$ represents the optical axis of the mirror and $fp$ its focal plane which can at certain times in the operation conveniently be occupied by the reticle of the sliding eyepiece 16. In Fig. 3 is shown the case of a true 90° prism.

Two typical rays of light FA and FD are shown emerging from the point F which, in addition to being the focus of the mirror *mm*, is the location of the virtual image in the small prism 22 of the pinhole (point source) 20. The ray FA is reflected from the mirror at A, strikes one face of the prism 29 at B, is reflected off this face and strikes the other face at C from which it is reflected along the line CD parallel to the line AB, since the prism is assumed to have a true 90° vertex angle. From D the ray is reflected and, since it entered the parabolic mirror along the line CD parallel to the axis *oa*, it must pass through the focus F of the mirror. Similarly the ray FD is reflected along DC, thence along CB, thence along BA, and finally from A back through the focus F since, again, BA enters the mirror parallel to its axis and must, therefore be reflected through the focus. Thus, on the reticle, if it is located in the focal plane of the mirror, will appear only one point of light constituted by the superposition of the image exemplified by the ray BA and the image exemplified by the ray CD.

Fig. 4 shows the situation for a prism where the vertex angle is slightly obtuse. A ray FE emanating from the vertical image of the pinhole 20 is reflected along EG parallel to the mirror axis but is internally reflected in the prism along HI which, because of the error in the prism angle, accordingly is not parallel to the axis of the mirror. Since HI, exemplary of the rays reflected from one leg face of the prism toward the mirror, enters the mirror not parallel to the mirror axis it will not be reflected through the focus F but will be reflected along IJ and will intersect the focal plane at some point J. Similarly the ray FK is reflected parallel to the mirrow axis along KL and emerges from the prism along MN, also not parallel to the mirror axis. This ray MN, exemplary of the rays reflected from the other leg face of the prism toward the mirror, therefore is reflected along NO and intersects the focal plane of the mirror at a point O removed from the focus. It will be observed that the rays NO and IJ diverge from each other in a direction measured away from the focal plane toward the surface of the mirror. If, after observing on the reticle while it is in the focal plane the two images at O and J of the pinhole, the reticle is moved toward the mirror by sliding the eyepiece 16 in that direction, the two light spots constituting the images will appear to move apart from each other. This phenomenon can then be used to conclude that the vertex angle of the prism is obtuse.

Fig. 5 shows the situation for a prism having an acute vertex angle. In this instance the ray FP is reflected along PQ into the prism and emerges along RS, not parallel to the axis of the mirror, so that it is reflected along the line SF producing an image at the point T in the focal plane. Likewise the ray FU is reflected along UE and emerges from the prism along WX, again not parallel to the axis of the mirror and is thereafter reflected along XY to form a second image in the focal plane at Y. It can be seen from the figure that sliding the eyepiece toward the mirror will in this instance cause the two images at T and Y to approach each other. This then can be used as an indication that the prism under test has an acute vertex angle.

From the foregoing the operation of the apparatus of the invention and the carrying out of its method should be clear. In brief, the method as applied to a 90°–45°–45° prism involves establishing a point source of light substantially at the focus of a parabolic mirror, placing a prism of this type in the field of view of the mirror with its hypotenuse generally facing the mirror in such a manner that light produced by the point source is reflected by the mirror into the prism and thereafter by the prism back into the mirror, and receiving the light finally reflected for the second time from the mirror on a reticle positioned in the neighborhood of the focus of the mirror. The operation of the device involves lighting the bulb 18 to provide a point source of light, which is more or less permanently correctly located substantially at the focus of the mirror 10, placing the prism 29 to be tested on the table 26, adjusting it in azimuth either by hand or by means of the vernier 25 and in altitude by means of the screw 28 until it produces an image on the reticle 17 which has been previously positioned substantially at the focus of the mirror 10. The eyepiece is moved in and out of the tube 15 and, as this is done, if two images are observed which approach each other as the eyepiece approaches the mirror then it can be concluded that the prism angle is acute, whereas if two images appear which approach each other as the eyepiece recedes from the mirror, then it can be concluded that the prism angle is obtuse. If one image only appears, the prism angle is proven to be 90°.

While the method and apparatus hereinbefore described were related to measuring the prism angle error in a 45°–45°–90° prism, the same can be used for actually measuring prism angles, for detecting and measuring pyramidal errors, and for observing these quantities in other types of prisms such as Porro prisms and in other reflecting optical elements such as arrangements of mirrors. In order to determine the pyramidal error in a 45°–45°–90° prism, for example, the prism is rotated, if necessary, slightly about its vertical axis until the long edges of the hypotenuse face are substantially parallel to the focal plane of the mirror. If the prism has no prism angle error but only pyramidal error there will appear two images on the reticle, one being the image produced by the various coincident rays internally reflected from the leg faces of the prism and the other, not so bright, produced by front-surface reflection from the hypotenuse face. The magnitude of the pyramidal error, which is the amount of lack of parallelism of the hypotenuse face of the prism with the vertex edge of the prism angle, is calculated by noting the distance measured along the vertical cross hair between the two images. In the event that the prism is also afflicted with prism angle error, three images will appear, the two hereinbefore discussed lying on a line parallel to or coincident with the horizontal cross hair, and the third being the front-surface reflection from the hypotenuse face. In this instance the magnitude of the pyramidal error is calculated from the distance between the front-surface image and the horizontal line joining the other two images. For use in measuring the actual prism angle of prism, the device is used as follows. The prism is set on the supporting table and the support is adjusted in such a manner that only one image of the point source is seen through the eyepiece and this image is located on the origin of the eyepiece scale. The vernier scale is now set at zero degrees. The prism support is rotated, presenting another face of the prism to the mirror, until only one image is seen, this image lying on the origin of the reticle scale. The angle through which the support has been rotated, as shown on the vernier scale, is the angle between the two faces.

From the foregoing it will be apparent that the present invention, by using a parabolic mirror, avoids the necessity for instruments using numerous optical elements that would be difficult to maintain in accurate alignment, avoids chromatic aberration involved with instruments having ordinary lenses, affords more brilliant illumination of the image than is available with the smaller objective necessarily used as a practical matter in systems employing lenses and more readily achieves a more nearly perfect parallelism of light than can be achieved with collimating lens systems of comparable aperture and cost.

Obviously many modifications and variations of the present invention are possible in the light of the above teachings. For example, while theoretically the mirror surface should be in the form of a paraboloid of revolution, substantially this surface can be achieved by the use of a spherical mirror of small aperture compared to its focal length, which mirror is included in the term "generally parabolic." It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A device of the character described comprising a parabolic mirror, a point source of light located substantially at the focus of said mirror for illuminating the mirror, a support adapted to support a prism or the like positioned within the field of view of said mirror for receiving light reflected from said mirror and returning it to said mirror for focusing, and a reticle positioned substantially at the focal point of said mirror for receiving an image of said point source focused by said mirror.

2. Arrangement for testing the angle between two angularly disposed reflecting surfaces comprising a generally parabolic mirror, means for establishing a point source of light substantially at the focal point of said mirror so that rays emanating from said source will be reflected substantially in parallel relation by said mirror, means for supporting the reflecting surfaces in the path of the rays to reflect the same from each surface to the other and thence back toward said mirror for focusing, and means mounted for movement generally along the optical axis of said mirror into and out of the focal plane thereof to receive an image of the point source of light.

3. Arrangement for testing the accuracy of the vertex angle of a right-angle prism comprising a generally parabolic mirror, means for establishing a point source of light substantially at the focal point of said mirror so that rays emanating from said source will be reflected substantially in parallel relation by said mirror, means for supporting the right-angle prism with its hypotenuse face generally facing said mirror so that internal reflections of the parallel rays by the leg faces of the prism will be directed back toward said mirror for focusing, and means positioned substantially within the focal plane of said mirror to receive the focused rays and thus exhibit an image of the point source of light.

4. Arrangement according to claim 3 comprising means for rotating said prism supporting means about a first axis perpendicular to the optical axis of the mirror, and means for rotating said supporting means about a second axis perpendicular to said first axis.

5. The method of testing the orientation of a reflecting surface of an optical element relative to a reference surface on the element which comprises illuminating a generally parabolic mirror from a point source of light positioned substantially at the focus of the mirror to produce parallel rays of light, directing the parallel rays of light against said reflecting surface in such a manner that the rays are thereafter reflected from said reflecting surface and ultimately redirected against said parabolic mirror for focusing, receiving and exhibiting in a field of view including a fiducial point on the axis of said mirror the image or images of the point source formed by the rays focused by said mirror, and observing the number of said images and the location thereof relative to the fiducial point substantially in the focal plane, and, if necessary, the location thereof relative to the focal axis in a plane parallel to the focal plane, the relative orientation of said reflecting surface being completely determined by the said number of images and the said location thereof.

References Cited in the file of this patent

UNITED STATES PATENTS

| Number | Name | Date |
| --- | --- | --- |
| 1,457,918 | Villiger et al. | June 5, 1923 |
| 2,362,235 | Barnes | Nov. 7, 1944 |
| 2,461,166 | Luboshez | Feb. 8, 1949 |
| 2,462,946 | Coggeshall et al. | Mar. 1, 1949 |

OTHER REFERENCES

Moffitt, G. W., "Instrument for the Testing of Prisms," Journal of the Optical Society of America, volume 7 (1923), pages 831–852. (Copy in Division 7.)